(No Model.)

A. B. NEIMAN.
WHIFFLETREE HOOK.

No. 460,755. Patented Oct. 6, 1891.

Witnesses.
W. H. Courtland
E. E. Grigg.

Inventor.
Alvin B. Neiman
by Read & Worthington
his Attorneys.

UNITED STATES PATENT OFFICE.

ALVIN B. NEIMAN, OF YORK, PENNSYLVANIA, ASSIGNOR TO THE SAFETY FERRULE COMPANY, (LIMITED,) OF SAME PLACE.

WHIFFLETREE-HOOK.

SPECIFICATION forming part of Letters Patent No. 460,755, dated October 6, 1891.

Application filed October 6, 1890. Serial No. 367,187. (No model.)

*To all whom it may concern:*

Be it known that I, ALVIN B. NEIMAN, a citizen of the United States, residing at York, in the county of York and State of Pennsylvania, have invented certain new and useful Improvements in Whiffletree-Hooks; and I do hereby declare the following to be a full, clear, and exact description of the invention, such as will enable others skilled in the art to which it appertains to make and use the same.

The object of this invention is to produce a whiffletree-hook cheap of manufacture, easy of manipulation, and durable.

This invention comprises a revoluble button or hook provided with a conical stem fitting in a similarly-shaped recess in the end of a socket secured to the whiffletree, the two conical surfaces being maintained, normally, in tight frictional contact by means of a pressure-spring.

Figure 1:
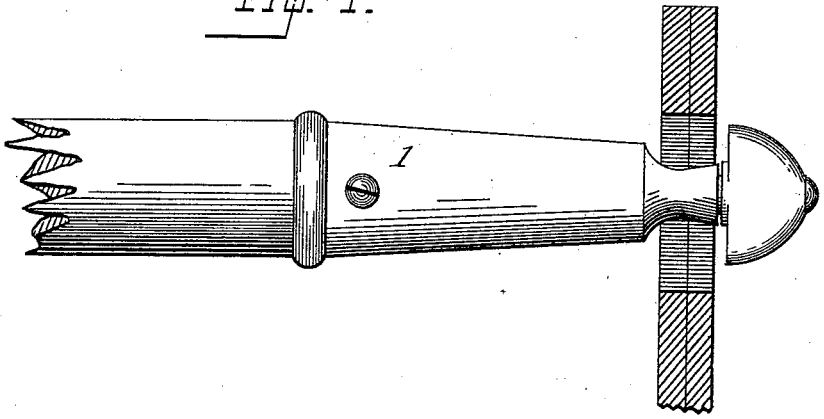
Figure 2:
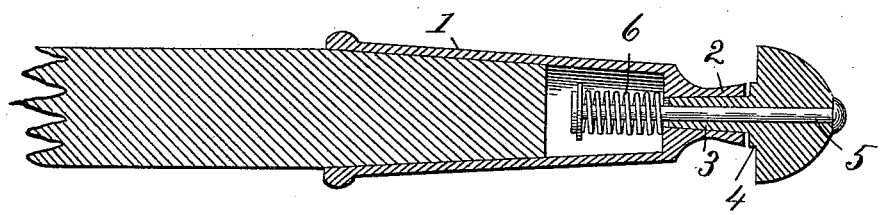
Figure 3:
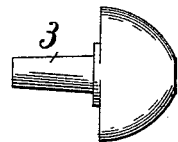
Figure 4:
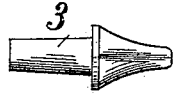

In the accompanying drawings, which illustrate the invention, Figure 1 is a view illustrating the end of a whiffletree with my improved device attached thereto, showing the trace locked in position by the hook or button. Fig. 2 is a sectional view illustrating my invention. Fig. 3 is a detail illustrating the hook.

The device comprises a socket 1, adapted to fit over the end of the whiffletree, being provided with a perforation through which a screw may pierce the end of the whiffletree. The outer end of the socket, as shown at 2, is reduced in size, so as to form a stem upon which the trace may be supported, and is provided with a tapering bore or recess having a smooth surface, in which the stem 3 of the hook enters, said stem also being conical or slightly tapering and sufficiently large at its outer end to prevent the shoulder 4 finding a bearing-surface on the outer edge of the socket. Through the hook extends a pin 5, and a stout coil-spring 6 presses the conical stem of the button into tight engagement with the conical opening in the socket.

In manipulating the hook the button is forced outwardly and given a partial turn, so as to bring the button into alignment with the eye of the trace, when the latter can readily be removed from the whiffletree; but when the trace is in place on the end of the socket and the hook is turned at right angles to the eye the two conical surfaces are forced into intimate contact by the spring 6, causing a tight frictional engagement, which will resist any tendency on the part of the button to turn, even if great force is applied to it. If, however, it is pressed outwardly, the slightest movement is sufficient to remove the friction of the surfaces and permit ready turning of the hook.

Having thus described my invention, what I claim, and desire to secure by Letters Patent, is—

The combination of a socket 1, trace-carrying tip 2, provided with a flaring opening, a button or hook provided with a co-operating tapering stem, pin 5, and spring 6 for holding the stem in tight frictional contact with the wall of the opening.

In testimony whereof I affix my signature in presence of two witnesses.

ALVIN B. NEIMAN.

Witnesses:
EDWD. CHAPIN,
EDW. G. S. MYERS.